US007288908B2

(12) United States Patent
Blossfeld et al.

(10) Patent No.: US 7,288,908 B2
(45) Date of Patent: Oct. 30, 2007

(54) SWITCHING ARRANGEMENT

(75) Inventors: Mike Blossfeld, South Lyon, MI (US); Robert B. Gilbert, Williamston, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 11/175,070

(22) Filed: Jul. 5, 2005

(65) Prior Publication Data

US 2007/0007919 A1 Jan. 11, 2007

(51) Int. Cl.
*H02P 7/00* (2006.01)

(52) U.S. Cl. ...................... 318/280; 318/466; 318/468; 318/467

(58) Field of Classification Search ................ 318/280, 318/466, 468, 445, 443, 467; 200/558; 307/10.1
See application file for complete search history.

(56) References Cited

U.S. PATENT DOCUMENTS

| | | | |
|---|---|---|---|
| 3,670,121 A | 6/1972 | Howe | |
| 4,179,593 A | 12/1979 | Tsunefuji | |
| 4,540,858 A | 9/1985 | Knoop | |
| 4,733,030 A * | 3/1988 | Erdelitsch et al. | 200/61.54 |
| 4,967,046 A | 10/1990 | Priesemuth | |
| 4,978,823 A | 12/1990 | Sato et al. | |
| 5,149,924 A | 9/1992 | Priesemuth | |
| 5,329,163 A | 7/1994 | Satoh et al. | |
| 5,598,918 A | 2/1997 | Malecke et al. | |
| 5,740,904 A | 4/1998 | Ishizuka et al. | |
| 5,833,048 A | 11/1998 | Dilly | |
| 6,091,038 A | 7/2000 | Murphy et al. | |
| 6,175,090 B1 | 1/2001 | Blossfeld | |
| 6,590,175 B1 | 7/2003 | Lam | |
| 6,632,108 B1 | 10/2003 | Hohlfelder | |
| 2004/0011636 A1 | 1/2004 | Sasaki et al. | |

OTHER PUBLICATIONS

Co-pending U.S. Appl. No. 10/693,508, filed Oct. 23, 2003 entitled "Rocker Switch".

* cited by examiner

*Primary Examiner*—Karen Masih
(74) *Attorney, Agent, or Firm*—Tarolli, Sundheim Covell & Tummino LLP

(57) ABSTRACT

An apparatus for controlling an electric motor (14) for, when energized, moving a vehicle window (22) selectively up or down and selectively in an auto up or auto down mode. The apparatus includes an electrical circuit electrically coupled to the electric motor (14) to energize the electrical motor (14) to move the window (22) toward one of the fully open and fully closed positions. The circuit includes a printed circuit board (46) and a first switch (10) for selectively energizing the electrical motor (14). An actuator (32) is movable to actuate the first switch (10) to actuate the electrical motor (14). A second switch (200) for selectively energizing the electrical motor (14) in an auto function mode is activated by a member (150) extending through the printed circuit board (46).

11 Claims, 9 Drawing Sheets

SWITCHING ARRANGEMENT

TECHNICAL FIELD

The present invention relates to an electrical switch arrangement.

BACKGROUND OF THE INVENTION

Switches for making and breaking electrical circuits are widely known. For example, a vehicle with an electric power device, such as a window, may have a control system with a switch for controlling operation of the window. The switch may be a switch assembly that has an actuator in the form of a lever pivotal to effectuate rocking movement of a contact as depicted in U.S. Pat. No. 5,598,918. The actuator is pivoted in opposite directions to actuate a rocker switch to engage and close electrical contacts for energizing the motor for the window. The motor raises or lowers the window depending on the direction and distance that the actuator is pivoted. To manually control movement of the window, the actuator is pivoted in one direction a predetermined distance to engage electrical contacts. The user holds the actuator in that position to energize the motor until the window is raised or lowered to a desired position. The pressure on the actuator is then released by the user to stop movement of the window.

The switch assembly also includes a second switch in the form of a dome switch that is also operatively connected with an actuatable electronic circuit. The circuit continuously energizes the motor to move the window to a fully open position or a fully closed position. Upon initial actuation, the circuit energizes the motor and maintains the energization even after the manual depression force applied to the switch is released. Initial actuation of the circuit typically occurs by pivoting the actuator, at least momentarily, to a position beyond the predetermined distance at which manual control of window movement takes place. This feature is known as "auto-down" or "auto-up".

The switch assembly includes a base that supports the dome and rocker switches and is mounted on board of a printed circuit board. The dome switches are carried on the printed circuit board immediately beneath the base. Because of the inclusion of the dome and rocker switches, the switch assembly is relatively large, requiring a significant amount of packaging space.

SUMMARY OF THE INVENTION

The present invention relates to an apparatus for controlling an electric motor for, when energized, moving a vehicle window selectively up or down and selectively in an auto up or auto down mode. The apparatus includes an electrical circuit electrically coupled to the electric motor to energize the electrical motor to move the window toward one of the fully open and fully closed positions. The circuit includes a printed circuit board and a first switch for selectively energizing the electrical motor. An actuator is movable to actuate the first switch to actuate the electrical motor. A second switch for selectively energizing the electrical motor in an auto function mode is activated by a member extending through the printed circuit board.

In another aspect of the present invention, an electrical switching arrangement includes a printed circuit board having a first side and a second side opposite the first side. A base is mounted to the first side of the board. A rocker switch is supported by the base and has a ground contact terminal.

The arrangement further includes a positive contact terminal for electrical connection to a source of electric power, and a pivot contact terminal for electrical connection to an electrical load. The rocker switch includes a conductive rocker contact. The conductive rocker contact is movable from a first position for electrically connecting the ground contact terminal to the pivot contact terminal and to a second position for electrically connecting the positive contact terminal to the pivot contact terminal.

A second switch is provided on the second side of the board and includes a first contact and a second contact. A first member is supported by the base for pivotable movement from a neutral position to a limit position in one direction. The first member has an intermediate position between the neutral and limit positions. The conductive rocker contact electrically connecting the positive contact terminal to the pivot contact terminal in response to pivotable movement of the first member from the neutral position to the intermediate position. A second member is supported for linear movement in the base adjacent the second switch and is movable in response to the first member being pivoted to the limit position. The second member moves to actuate the second switch to electrically connect the first and second electrical contacts when the first member is pivoted to the limit position.

BRIEF DESCRIPTION OF THE DRAWINGS

The foregoing and other features of the invention will become more apparent to one skilled in the art upon consideration of the following description of the invention and the accompanying drawings in which.

DESCRIPTION OF EMBODIMENTS

The present invention relates to an electrical switching arrangement for controlling a device on a vehicle. The device may be any device on a vehicle, such as a window, a seat, a mirror, or the like. The specific embodiment of the invention described below relates to a power window. Those skilled in the art, however, will appreciate that the switch of the present invention may control a device other than a window.

Figure 1:
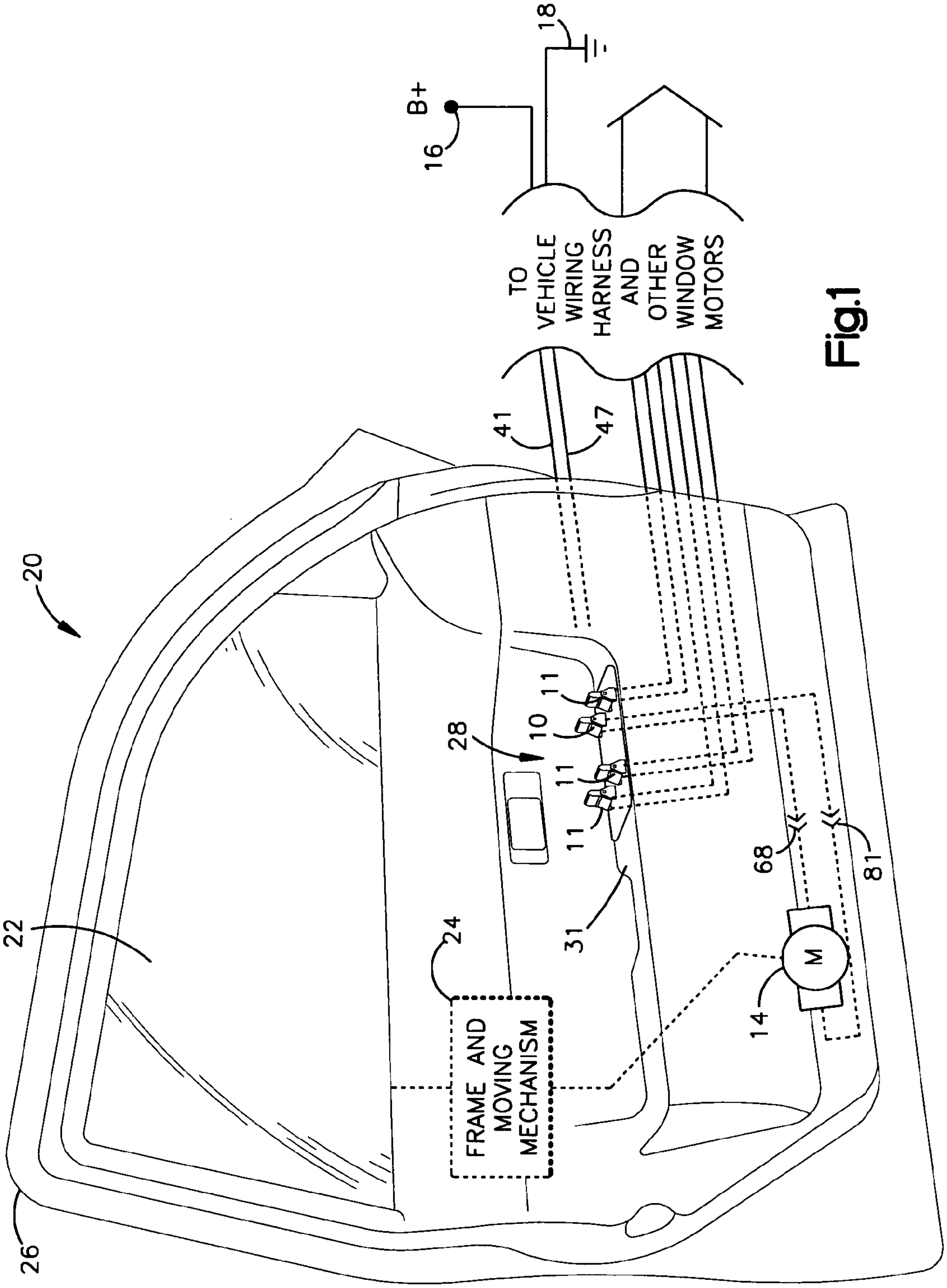
FIG. 1 is a schematic diagram illustrating a vehicle power window control system having a switching arrangement embodying the present invention.

As depicted in FIG. 1, a vehicle power window system 20 includes a window 22 mounted in a movable frame and moving mechanism 24 inside of a door 26. The window 22 slidably moves in opposite directions between a fully opened position and a fully closed position. A master control assembly 28 is mounted in an arm rest 31 of the door 26 near a seat (not shown) for a driver of the vehicle to manipulate.

The master control assembly 28 provides the driver of the vehicle with the ability to control the position and the movement of each of the windows 22 of the vehicle. The master control assembly 28 is electrically connected to a source of vehicle power 16 (B+) through a conductor 41 and a chassis or frame connection 18 (ground) through a conductor 47. The master control assembly 28 includes a plurality of individual switch assemblies 10, 11.

Each of the switch assemblies 10, 11 is pivotable in opposite directions to effect movement of an associated window 22 of the vehicle. Each of the switch assemblies 10, 11 is resiliently biased to return to a centered or neutral position at which movement of the window 22 is not effected. In the illustrated embodiment, one switch assembly 10 of the master control assembly 28 is described herein. The master control assembly 28 also includes three switch assemblies 11. It will be apparent that any alternate combination of the switch assemblies 10, 11 can be used in the master control assembly 28.

The switch assembly 10, embodying the present invention, controls the operation of the window 22 adjacent the driver position. The switch assemblies 11 control the windows 22 located remotely away from the driver, such as the window located adjacent a front seat passenger position and the windows adjacent the back seat passenger positions. All of the switch assemblies 10, 11 are capable of "manual" control of the movement of an associated window 22. A pair of second switches 200, 210 in close proximity to the switch assembly 10 at the front left corner of the arm rest 30, is provided for "automatic" control of the movement of the window 22 adjacent the driver position. If desired, additional switches can be provided for "automatic" control of the movement of their respective windows.

Each of the switch assemblies 10, 11 is electrically connected to a respective electric motor 14 to control operation of the motor. The motor 14 is operatively connected to the frame and moving mechanism 24 supporting the window 22. The motor 14 cooperates with the frame and moving mechanism 24 to move the window 22 between the fully open position and the fully closed position when the motor is energized. The source of electrical power 16 is electrically connected to an ignition switch. The electric motor 14 is a DC motor capable of bi-directional rotation.

The switch assemblies 10, 11 are in the form of rocker switch assemblies (hereinafter "rocker switch"). However, the switch assemblies can be in the form of other switch constructions. Referring to FIGS. 3-6, the rocker switch 10 is mounted on a top side 159 (FIG. 2) of a printed circuit board 46. The rocker switch 10 includes a base 30 that supports an actuator in the form of a lever 32 for pivotal or rotational movement about an axis 34. A series of terminals 40 protrude from a lower surface 36 of the base 30 of the rocker switch 10. In the illustrated embodiment, the rocker switch 10 includes six such terminals 40 arranged in first and second rows 42 and 44. The terminals 40 are for connecting the rocker switch 10 to plated-through holes 48 of the printed circuit board member 46. The terminals 40 may thus carry electrical signals between the rocker switch 10 and the other portions of the system 12 via the printed circuit board 46, as will be described herein below.

Figure 4:
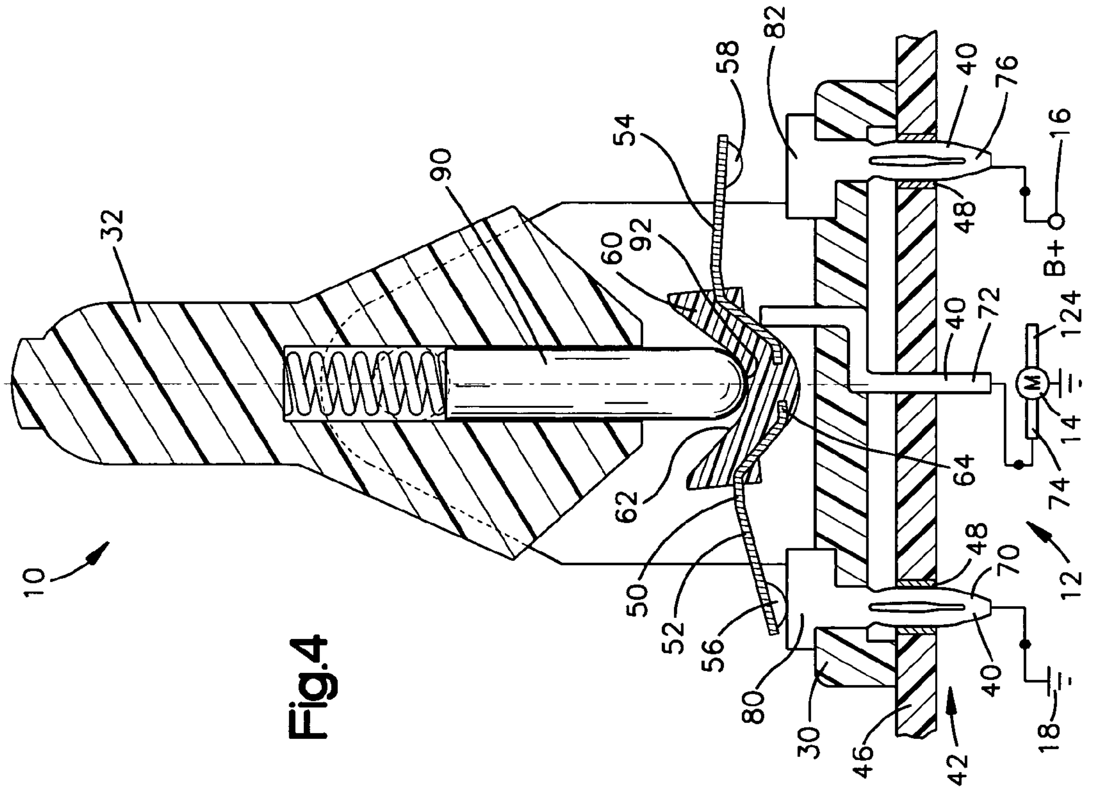
FIG. 4 is a sectional view taken generally along line 4-4 in FIG. 3, showing parts of the rocker switch in different positions.
Figure 3:
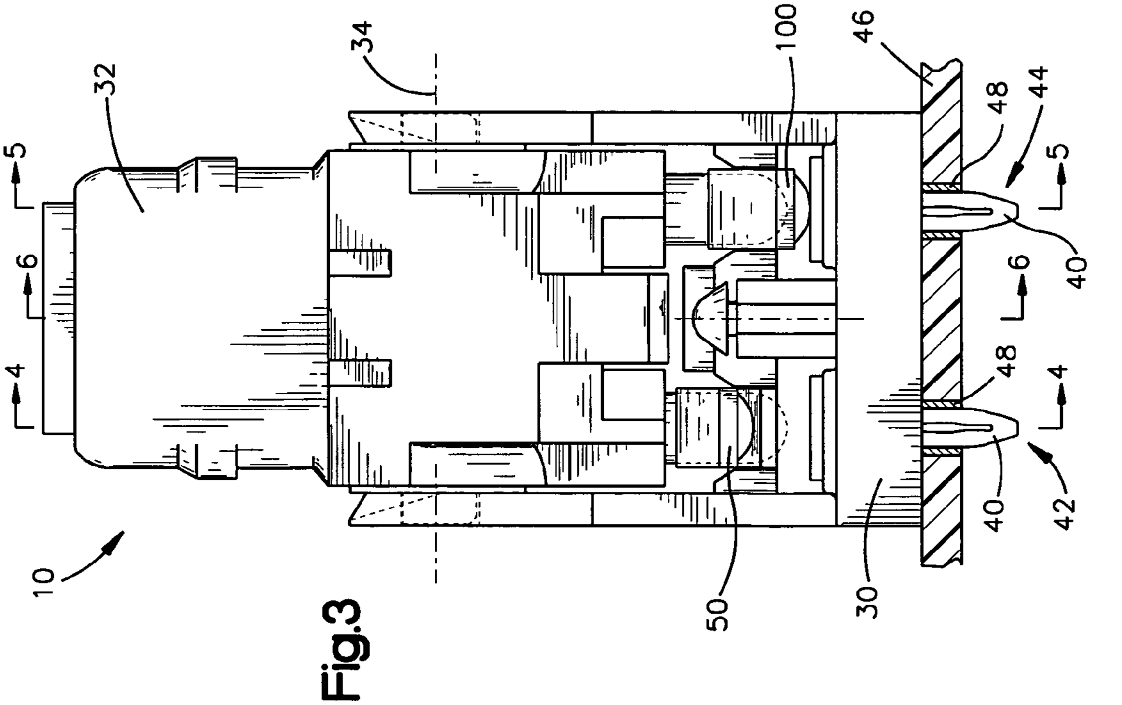
FIG. 3 is an end view of the switching arrangement illustrated in FIG. 2.

Referring to FIG. 3, the rocker switch 10 includes first and second switch members 50 and 100 associated with the first and second rows 42 and 44 of terminals 40, respectively. Referring to FIG. 4, the first switch member 50 includes a first contact arm 52 and an opposite second contact arm 54. The first and second contact arms 52 and 54 are in electrical contact with each other and may, for example be formed of a single piece of metal material, such as copper or a copper alloy. The first and second contact arms 52 and 54 each may include a domed contact portion 56 and 58, respectively.

The first switch member 50 is supported by a body portion 60 that may be formed of a material, such as plastic. The first switch member 50 may thus be insert molded in the body portion 60. The body portion 60 includes an upper actuator surface 62 and an opposite lower rocker surface 64. The first and second contact arms 52 and 54 each have a portion exposed on the rocker surface 64 of the body portion 60.

As shown in FIG. 4, the first switch member 50 is associated with the three terminals 40 in the first row 42. Among these terminals are a terminal 70 connected to ground 18, a terminal 72 connected to a first directional input 74 of the motor 14, and a terminal 76 connected to the battery 16. The terminals 70, 72, and 76 are formed of an electrically conductive material, such as metal, and may be connected to the base 30 by suitable means, such as by insert molding or press fitting the terminals into the base 30. The ground terminal 70 includes a contact portion 80 presented toward the contact portion 56 of the first contact arm 52. The battery terminal 76 includes a contact portion 82 presented toward the contact portion 58 of the second contact arm 54.

The rocker surface 64 of the body portion 60 is supported by the base 30 of the rocker switch 10 and/or the motor terminal 72. In this configuration, the first switch member 50 is maintained in electrical contact with the motor terminal 72. A spring biased actuator pin 90 supported in the lever 32 has a domed end surface 92 that rides on the actuator surface 62 of the body portion 60 and helps maintain the body portion and first switch member 50 supported on the base 30 and/or motor terminal 72.

Figure 5:
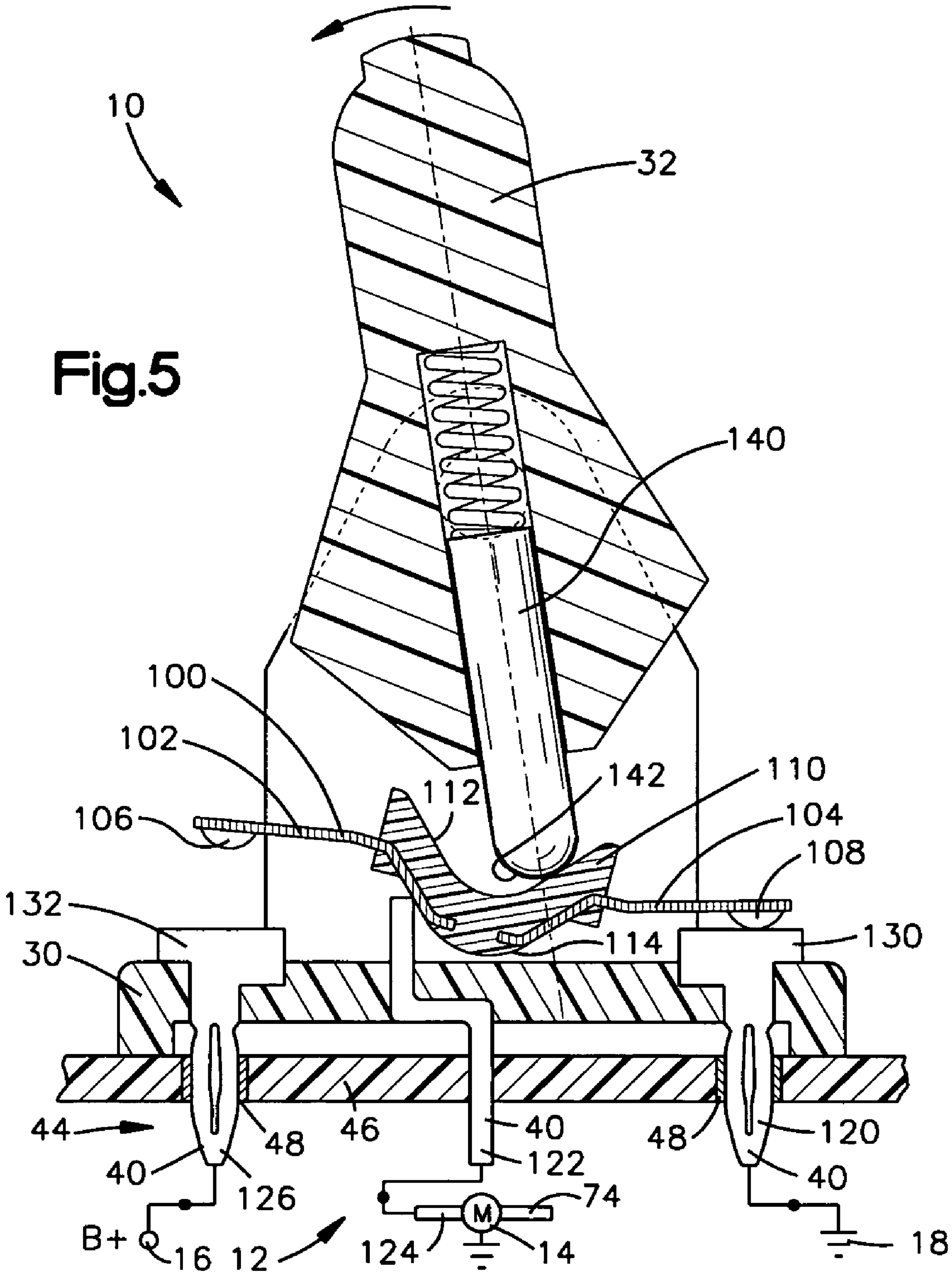
FIG. 5 is a sectional view taken generally along line 5-5 in FIG. 3, showing parts of the rocker switch in different positions.

Referring to FIG. 5, the second switch member 100 includes a first contact arm 102 and an opposite second contact arm 104. The first and second contact arms 102 and 104 are in electrical contact with each other and may, for example be formed of a single piece of metal material, such as copper or a copper alloy. The first and second contact arms 102 and 104 each may include domed contact portions 106 and 108, respectively.

The second switch member 100 is supported by a body portion 110 that may be formed of a material, such as plastic. The second switch member 100 may thus be insert molded in the body portion 110. The body portion 110 includes an upper actuator surface 112 and an opposite lower rocker surface 114. The first and second contact arms 102 and 104 each have a portion exposed on the rocker surface 114 of the body portion 110.

The second switch member 100 is associated with the three terminals 40 of the second row 44. Among these terminals 40 are a terminal 120 connected to ground, a terminal 122 connected to a second directional input 124 of the motor 14, and a terminal 126 connected to the battery 16. The terminals 120, 122, and 126 may be formed of an electrically conductive material and may be connected to the base 30 by suitable means, such as insert molding or press fitting the terminals into the base 30 of the rocker switch 10.

The ground terminal 120 includes a contact portion 130 presented toward the contact portion 106 of the first contact arm 102. The battery terminal 126 includes a contact portion 132 presented toward the contact portion 108 of the second contact arm 104.

The rocker surface 114 of the body portion 110 is supported by the base 30 of the rocker switch 10 and/or the motor terminal 122. In this configuration, the second switch member 100 is maintained in electrical contact with the motor terminal 122. A spring biased actuator pin 140 supported in the lever 32 has a domed end surface 142 that rides on the actuator surface 112 of the body portion 110 and helps maintain the body portion and second switch member 100 supported on the base 30 and/or motor terminal 122.

Figure 6:
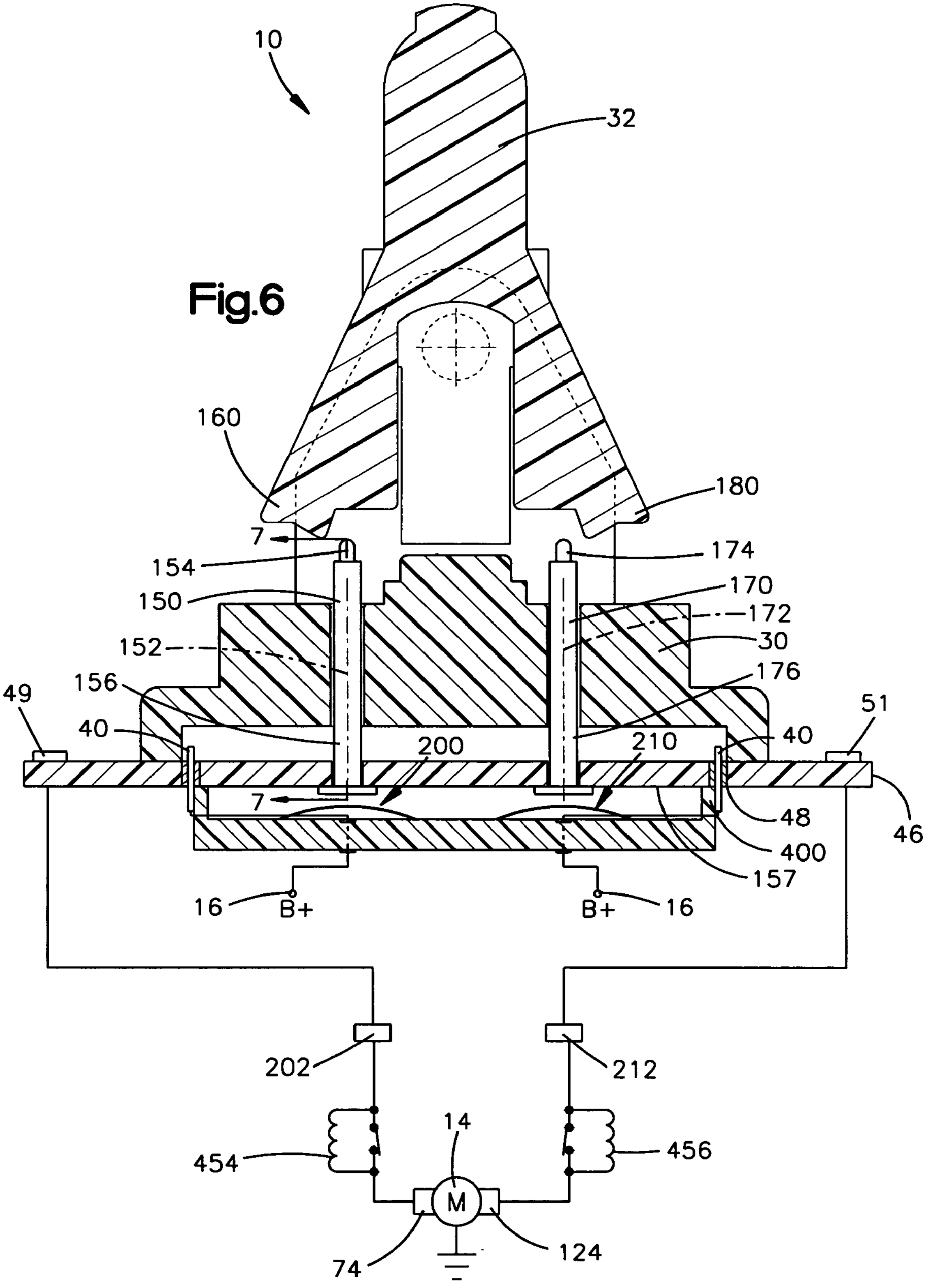
FIG. 6 is a sectional view taken generally along line 6-6 in FIG. 3 and through the auto function module shown in FIG. 2.

Referring to FIG. 6, a pair of elongated vertically oriented actuators 150, 170 extend through the base 30 of the rocker switch 10 and through openings in the board 46 for axial movement along respective axes 152, 172. The actuators 150, 170 are generally formed of a hard plastic material. The lever 32 includes first and second actuator arms 160 and 180 associated with the first and second actuator members 150 and 170, respectively.

The first actuator member 150 has a domed actuator end 154 presented toward the first actuator arm 160 of the lever 32 and an opposite actuator end 156 (FIG. 2), defining a square shaped head portion, that protrudes from the bottom side 157 of the printed circuit board 46. The first actuator member 150 may be biased by means (not shown) such as a spring to an up or non-actuated position illustrated in FIGS. 6 and 7.

The second actuator member 170 has a domed actuator end 174 presented toward the second actuator arm of the lever 32 and an opposite actuator end 176 (FIG. 2) defining a square shaped head portion, that protrudes from the bottom side 157 of the printed circuit board 46. The second actuator member 170 may be biased by means (not shown) such as a spring to an up or non-actuated position illustrated in FIGS. 6 and 7.

Referring to FIG. 4, the first switch member 50 is maintained in contact with the motor terminal 72 regardless of the position of the lever 32. Electrical conductivity is thus maintained between the first directional input 74 of the motor 14 and the first switch member 50 regardless of the position of the lever 32. As shown in FIG. 4, when the lever 32 is in a non-actuated central or neutral position, the first directional input 74 of the motor 14 is connected to ground 18 via the first contact arm 52 and the ground terminal 70. This prevents the motor 14 from being energized to run in a first rotational direction associated with the first directional input 74.

If the lever 32 is actuated in a counterclockwise direction, the actuator pin 90, riding on the actuator surface 62, urges the first switch member 50 to rock clockwise such that the contact portion 58 of the second contact arm 54 engages the contact portion 82 of the battery terminal 76. In this first actuated condition, voltage from the battery 16 is supplied to the first directional input 74 of the motor 14, which energizes the motor to run in the first rotational direction. This may result in the vehicle window raising or lowering, depending on the wiring configuration of the system 12. For purposes of this description, it will be assumed that the window lowers when the motor 14 runs in the first rotational direction.

If the lever 32 is actuated in a clockwise direction, the actuator pin 90, riding on the actuator surface 62, urges the first switch member 50 to rock counterclockwise such that the contact portion 56 of the first contact arm 52 engages the contact portion 80 of the ground terminal 70. In this second actuated condition, the first directional input 74 of the motor 14 is connected to ground 18. This prevents the motor 14 from being energized to run in the first rotational direction.

Referring to FIG. 5, the second switch member 100 is maintained in contact with the motor terminal 122 regardless of the position of the lever 32. Electrical conductivity is thus maintained between the second directional input 124 of the motor 14 and the second switch member 100 regardless of the position of the lever 32. When the lever 32 is in the non-actuated position, the second directional input 124 of the motor 14 is connected to ground 18 via the second contact arm 104 and the ground terminal 120. This prevents the motor 14 from being energized to run in a second rotational direction associated with the second directional input 124.

If the lever 32 is actuated in a counterclockwise direction to the first actuated condition of the rocker switch 10 as shown in FIG. 5, the actuator pin 140, riding on the actuator surface 112, urges the second switch member 100 to rock clockwise such that the contact portion 108 of the second contact arm 104 engages the contact portion 130 of the ground terminal 120. Thus, in the first actuated condition, the second directional input 124 of the motor 14 is connected to ground 18. This prevents the motor 14 from being energized to run in the second rotational direction.

If the lever 32 is actuated in a clockwise direction to the second actuated condition, the actuator pin 140, riding on the actuator surface 112, urges the second switch member 100 to rock counterclockwise such that the contact portion 106 of the first contact arm 102 engages the contact portion 132 of the battery terminal 126. In this second actuated condition, voltage from the battery 16 is supplied to the second directional input 124 of the motor 14, which causes the motor to run in the second rotational direction. As a result, the vehicle window would raise.

Figure 2:
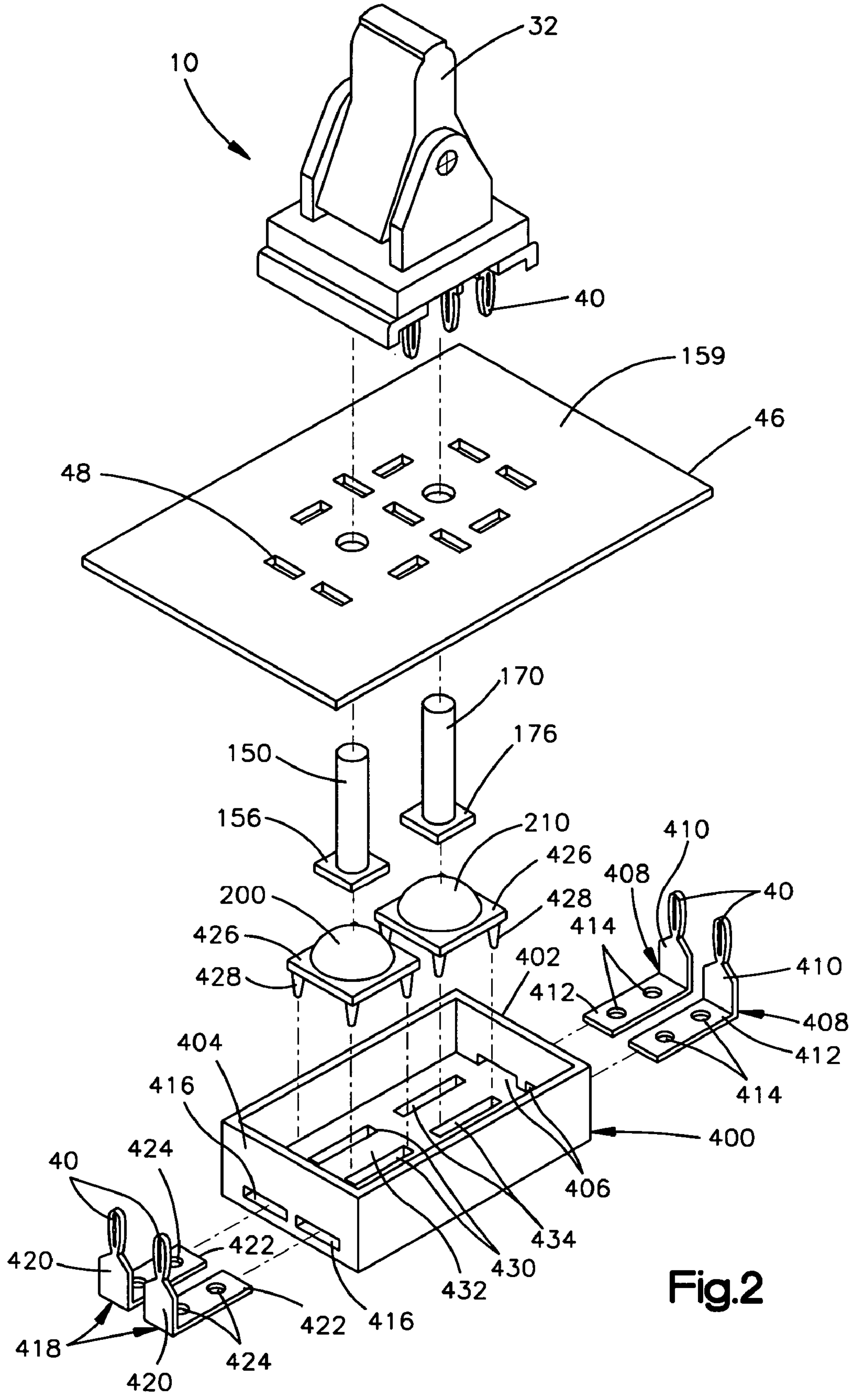
FIG. 2 is an exploded view of the switching arrangement of FIG. 1.

Referring to FIGS. 2 and 6, the first dome switch 200 is actuatable to switch electrical power from the vehicle battery 16 to a first auto-down circuit 202, which is electrically connected to the first directional input 74 of the motor 14. A microprocessor 49 (FIG. 6) is mounted on the printed circuit board 46 and interfaces with the auto-down circuit 202. The auto-down circuit 202 energizes a relay 454 to allow the motor 14 to remain powered and lower the window fully without input from the operator. The second dome switch 210 is actuatable to switch electrical power from the vehicle battery 16 to an auto-up circuit 212, which is electrically connected to the second directional input 124 of the motor 14. A microprocessor 51 (FIG. 6) is mounted on the printed circuit board 46 and interfaces with the auto-up circuit 212. The auto-up circuit 212 energizes a relay 456 to allow the motor 14 to remain powered and raise the window fully without input from the operator.

As depicted in FIG. 2, the dome switches 200, 210 are part of an auto function module 401, which further includes a housing 400 and L-shaped support members 408, 418. The dome switches 200, 210 are carried in the rectangular shaped housing 400. The housing 400 includes opposite upstanding front and rear side walls 402, 404. A pair of slots 406 are disposed in the front side wall 402 and each slot 406 slidably receives one L-shaped support member 408 composed of a generally conductive metallic material. The L-shaped support member 408 includes an upper portion 410 and lower base portion 412. The base portion 412 includes barbs that retain the support member 408 to the housing 400 after being slid through the slot 406. The base portion 412 further includes a pair of through holes 414. A terminal 40 is attached to the top end of the upper portion 410 of the support member 408.

A pair of slots 416 are disposed in the rear side wall 404 and each slot 416 slidably receives one L-shaped support member 418 composed of a generally conductive metallic material. The L-shaped support member 418 includes an upper portion 420 and lower base portion 422. The base portion 422 includes barbs that retain the support member 418 to the housing 400 after being slid through the slot 416. The base portion 422 further includes a pair of through holes 424. A terminal 40 is attached or integrally formed to the top end of the upper portion 420 of each of the support members 418.

The terminals 40 on the support members 408, 418 mechanically and electrically connect the auto function module 401 to plated-through holes 48 of the printed circuit board member 46. The terminals 40 may thus carry electrical signals between the dome switches 200, 210 and the other portions of the system 12 via the printed circuit board 46.

Each of the dome switches 200, 210 includes a square shaped base member 426 that has four conductive pins 428 depending downwardly there from. The pins 428 for the dome switch 200 are conically shaped and extend through respective through holes 424 of the base portions 422 of the support members 418 and slits 430 formed in the bottom wall 432 of the housing 400. The pins 428 for the dome switch 210 are conically shaped and extend through respective through holes 414 of the base portions 412 of the support members 408 and slits 434 formed in the bottom wall 432 of the housing 400. Each pin 428 engages the portion of the base portion adjacent its respective through hole to form an electrical connection.

The dome switches are located directly under the rocker switch. In particular, the dome switches 200, 210 and the remaining parts of the auto function module 401 are located within the periphery of the bottom of the base 30 of the rocker switch 10 to create a compact configuration so that the length and width of the overall arrangement of the auto function module 401 and rocking switch 10 is at a minimum.

Figure 7:
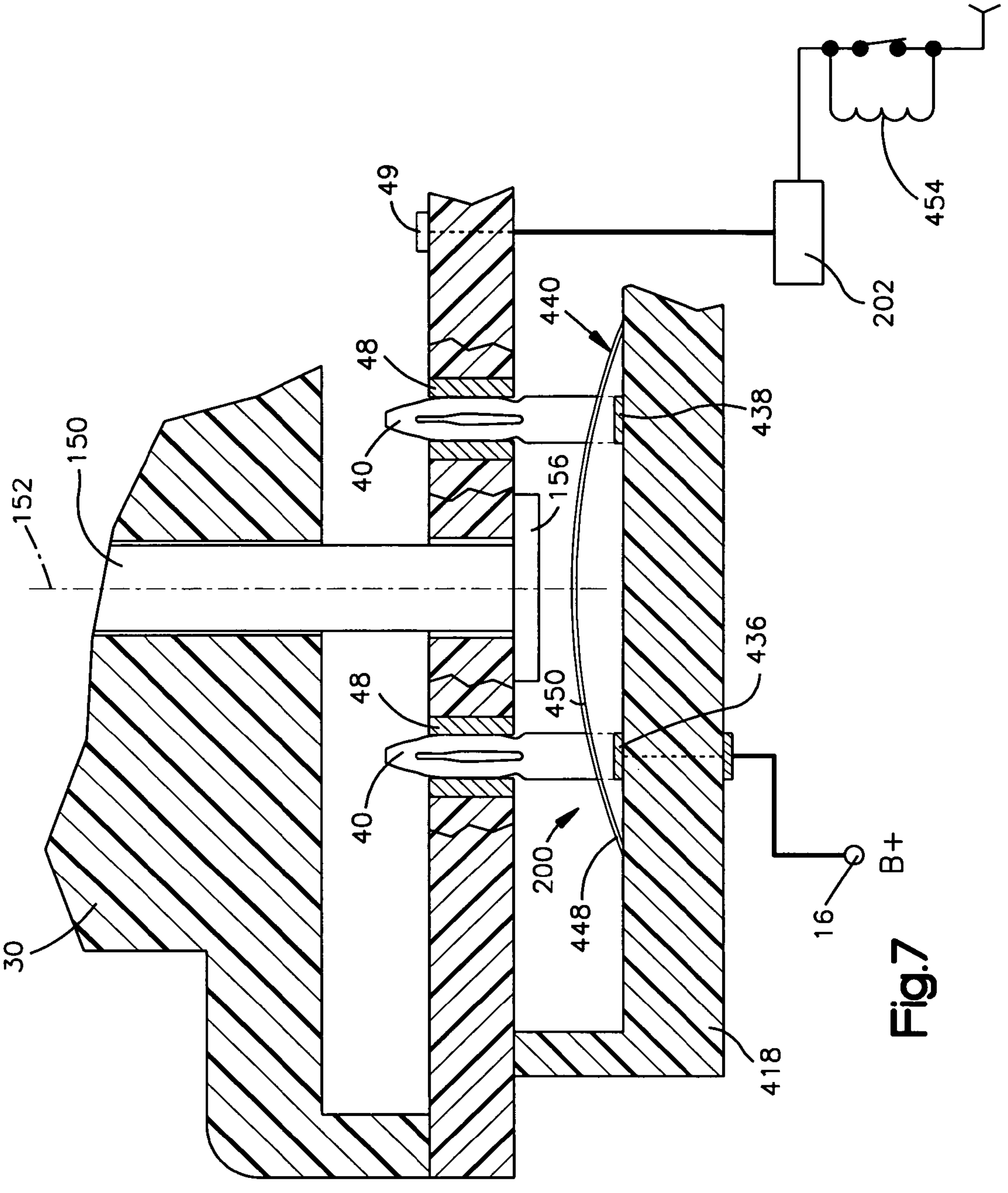
FIG. 7 is an enlarged partial sectional view taken along line 7-7 of FIG. 6 with portions broken away for illustrative purposes.
Figure 8:
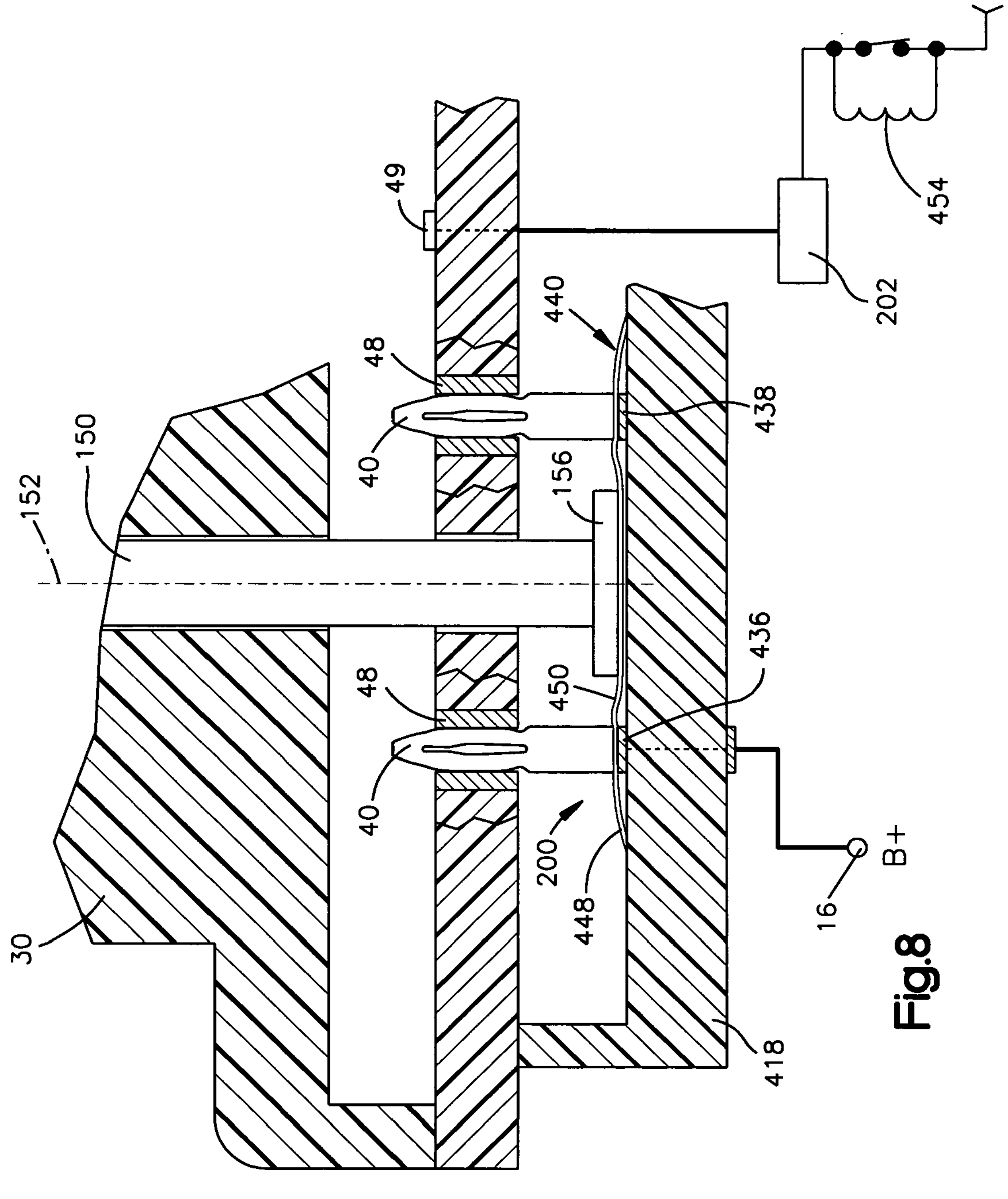
FIG. 8 is a view similar to FIG. 7 with parts illustrated in different positions.

Each of the dome switches 200, 210 is similar in design so only dome switch 200 will be discussed for purposes of convenience. As depicted in FIGS. 7 and 8, The dome switch 200 includes a first ring contact 436 and a second circular contact 438 located coaxially within the ring-shaped contact. A conductive disk 440 is preferably made of a resiliently deflectable metal material and is located above the contacts 436, 438. The disk 440 includes a periphery 448 and a dome portion 450, which is preferably a section of a sphere. The disk 440 is affixed to the base 426 at its periphery 448 by suitable means, such as tape or solder. The disk 440 is deflectable into engagement with the contacts 436, 438. The actuator end 156 is located above the dome switch 200. Each of the actuators 150, 170 is movable in a direction which is linear and perpendicular to the dome portion 450 its respective disk 440.

When the lever is pivoted fully in the counterclockwise direction, the actuator 150 is linearly moved in a downward direction as illustrated in FIG. 8. The actuator is moved in a direction substantially normal to the disk 440 to deflect the dome portion 450 of the disk into engagement with the contacts 436, 438. This closes the dome switch 200 and activates the auto-lower circuit 202.

As shown in FIG. 6, when the lever 32 is in the non-actuated position, the first and second dome switches 200 and 210 remain in the non-actuated condition. Thus, when the lever 32 is in the non-actuated position, the auto-lower circuit 202 and the auto-raise circuit 212 remain in a non-actuated or non-energized condition.

If the lever 32 is actuated in a counterclockwise direction beyond the first actuated condition, the first actuator arm 160 of the lever 32 engages the first actuator member 150 and urges the first actuator member in a downward direction along the axis 152. If the lever 32 is actuated a predetermined distance in the counterclockwise direction, the first actuator member 150 will actuate the first dome switch 200 and thus energize the auto-lower circuit 202.

Once energized, the auto-lower circuit 202 is operative to energize the first directional input 74 of the motor 14 to cause the window to lower automatically to a fully-lowered, i.e., open position. Once energized, the auto-lower circuit 202 is sealed in the energized state until the command is canceled either via a manual command (i.e., by actuating the lever 32 in the clockwise direction) or via an internal cancel triggered by means, such as a motor current sensor, motor torque sensor, or limit switch (not shown).

If the lever 32 is actuated in a clockwise direction beyond the second actuated condition, the second actuator arm 180 of the lever 32 engages the second actuator member 170 and urges the second actuator member in a downward direction along the axis 172. If the lever 32 is actuated a predetermined distance in the counterclockwise direction, the second actuator member 170 will actuate the second dome switch 210 and thus energize the auto-raise circuit 212.

Once energized, the auto-raise circuit 212 is operative to energize the second directional input 124 of the motor 14 to cause the window to raise automatically to a fully-raised, i.e., closed position. Once energized, the auto-raise circuit 212 is sealed in the energized state until the command is canceled either via a manual command (i.e., by actuating the lever 32 in the counterclockwise direction) or via an internal cancel triggered by means, such as a motor current sensor, motor torque sensor, anti-pinch circuit, or limit switch.

Figure 9:
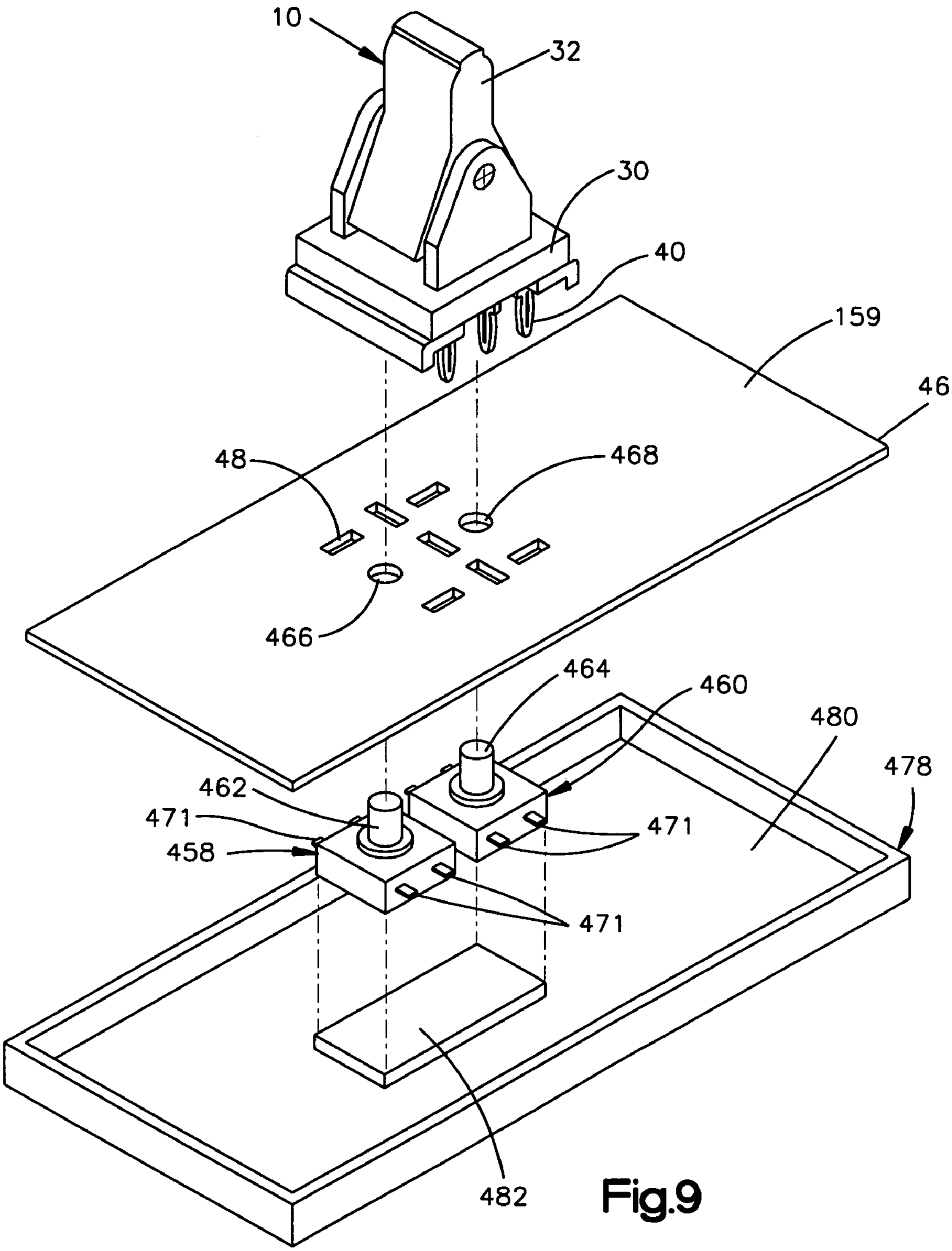
FIG. 9 is an exploded view of another embodiment of the switching arrangement of the present invention.
Figure 10:
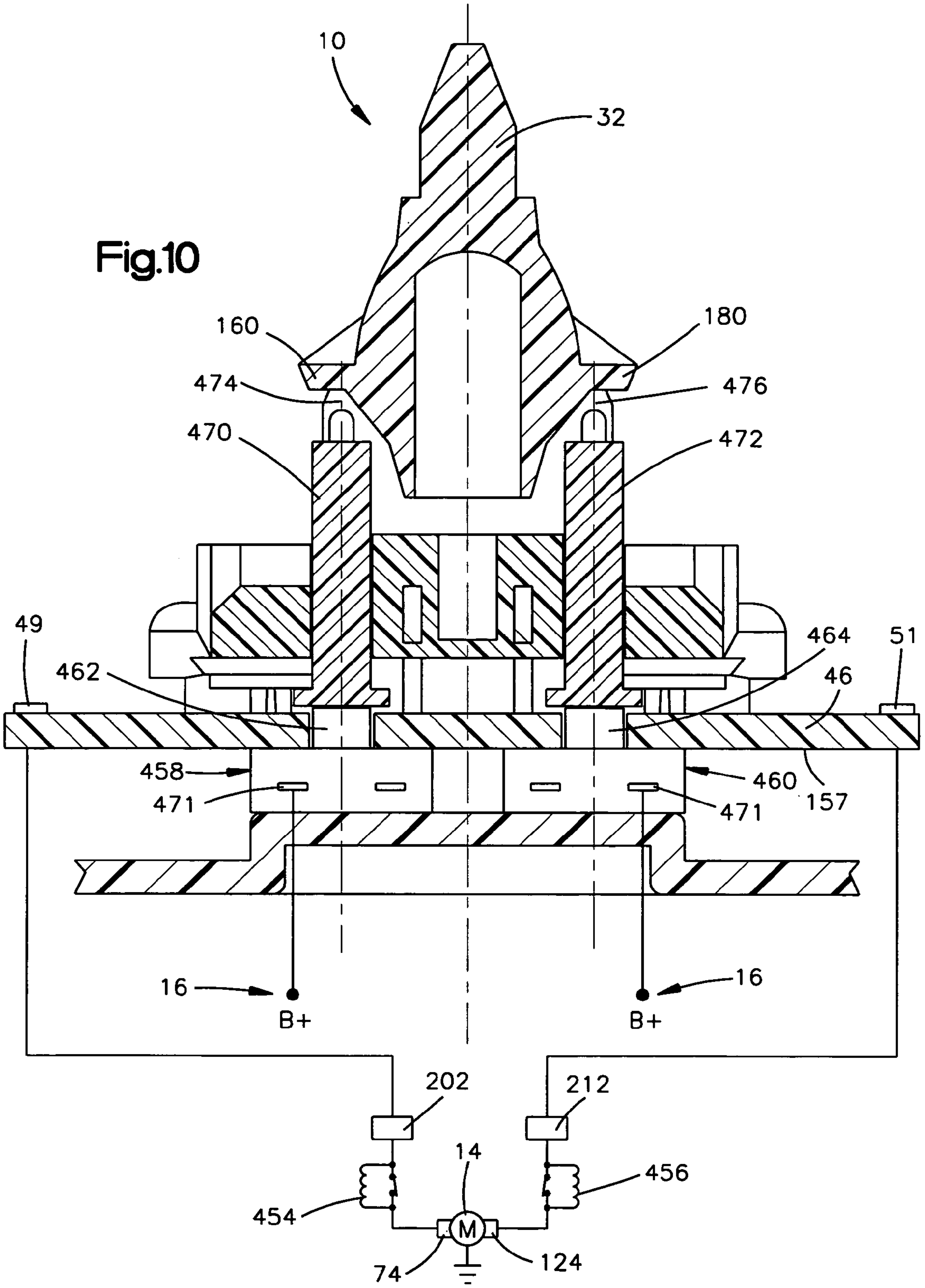
FIG. 10 is a side sectional view taken through the center of FIG. 9.

In another embodiment as depicted in FIGS. 9 and 10, a pair of micro switches 458, 460 replace the dome switches 200, 210. The micro switches 458, 460 include respective upwardly biased push buttons 462, 464 that extend through respective openings 466, 468 in the printed circuit board 46. Each of the micro switches 458, 460 include electrical contacts 471 for connection to the battery 16, the auto-lower circuit 202 via the microprocessor 49, and the auto-raise circuit 212 via the microprocessor 51. A pair of elongated vertically oriented actuators 470, 472 extend through the base 30 of the rocker switch 10 and are located above their respective push buttons 462, 464. The micro switches 458, 460 are reflowed soldered to the bottom side 157 of the board. Reflow soldering involves heating the board 46 in an oven to melt the solder material to join or solder the electrical component to the board. The rocker switch 10, printed circuit board 46, and micro switches 458, 460 are carried by a rectangulary shaped base 478. The base 478 includes a bottom wall 480 having a rectangulary shaped platform 482 that supports the micro switches 458, 460.

As shown in FIG. 9, when the lever 32 is in the non-actuated position, the first and second micro switches 462, 464 remain in the non-actuated condition with their push buttons 462, 464 extended. Thus, when the lever 32 is in the non-actuated position, the auto-lower circuit 202 and the auto-raise circuit 212 remain in a non-actuated or non-energized condition.

If the lever 32 is actuated in a counterclockwise direction beyond the first actuated condition, the first actuator arm 160 of the lever 32 engages the first actuator member 470 and urges the first actuator member 470 in a downward direction along axis 474. If the lever 32 is actuated a predetermined distance in the counterclockwise direction, the first actuator member 470 depresses the push button 462 to actuate the first micro switch 458 and thus energize the auto-lower circuit 202.

Once energized, the auto-lower circuit 202 is operative to energize the first directional input 74 of the motor 14 to cause the window to lower automatically to a fully-lowered, i.e., open position. Once energized, the auto-lower circuit 202 is sealed in the energized state until the command is canceled either via a manual command (i.e., by actuating the lever 32 in the clockwise direction) or via an internal cancel triggered by means, such as a motor current sensor, motor torque sensor, or limit switch (not shown).

If the lever 32 is actuated in a clockwise direction beyond the second actuated condition, the second actuator arm 180 of the lever 32 engages the second actuator member 472 and urges the second actuator member 472 in a downward direction along the axis 476. If the lever 32 is actuated a predetermined distance in the counterclockwise direction, the second actuator member 472 depresses the push button 464 to actuate the second micro switch 460 and thus energize the auto-raise circuit 212.

Once energized, the auto-raise circuit 212 is operative to energize the second directional input 124 of the motor 14 to cause the window to raise automatically to a fully-raised, i.e., closed position. Once energized, the auto-raise circuit 212 is sealed in the energized state until the command is canceled either via a manual command (i.e., by actuating the lever 32 in the counterclockwise direction) or via an internal cancel triggered by means, such as a motor current sensor, motor torque sensor, or limit switch.

Each of the terminals 40 comprises what may be referred to as a compliant connector pin or a compliant pin. Compliant pins are given this name because they deflect, deform, or otherwise comply with a hole or aperture into which they are press-fitted in order to form an interference fit. This interference fit helps connect the compliant pin to a member in which the hole or aperture extends. The terminals 40 may have a variety of compliant pin configurations. As a result of the compliant pin construction of the terminals 40, the rocker switch 10 and auto function module 401 of the present invention may be installed in a quick and reliable manner without the use of solder or other materials, such as adhesives or fasteners. Further details of one example of a compliant pin configuration are disclosed in commonly owned co-pending application having Ser. No. 10/693,508; the disclosure of which is hereby incorporated by reference.

From the above description of the invention, those skilled in the art will perceive improvements, changes and modifications. For example, the dome switches 200, 210 can be mounted on a second printed circuit board instead of the auto function module. Such improvements, changes and modifications within the skill of the art are intended to be covered by the appended claims.

Having described the invention, the following is claimed:

1. An apparatus for controlling an electric motor for, when energized, moving a vehicle window selectively up or down and selectively in an auto up or auto down mode, said apparatus comprising:

an electrical circuit electrically coupled to the electric motor to energize the electrical motor to move the window toward one of fully open and fully closed positions, said circuit including:

a printed circuit board;

a first switch for selectively energizing the electrical motor;

an actuator movable to actuate said first switch to actuate the electrical motor; and a second switch for selectively energizing the electrical motor in an auto function mode, said second switch being activated by a member extending through said printed circuit board.

2. The apparatus of claim 1 wherein said printed circuit board has a first side and a second side opposite said first side, said first switch being mounted on said first side and said second switch being mounted on said second side.

3. The apparatus of claim 2 wherein said actuator is movable to cause said member to activate said second switch to energize the electrical motor.

4. The apparatus of claim 1 wherein said second switch is soldered to said second side of said board.

5. The apparatus of claim 1 wherein said second switch is a micro switch.

6. The apparatus of claim 1 wherein said second switch is located within the periphery of said first switch.

7. The apparatus of claim 1 wherein one of said first and second switches comprise a terminal for helping to mount said second switch to said printed circuit board, said terminal comprising a compliant pin connector.

8. The apparatus of claim 1 wherein said second switch is a dome switch, an electrically conductive disk having a periphery and a domed portion, said periphery being in electrical contact with one of a first and a second electrical contact, the other of said first and second electrical contacts being located adjacent said disk and initially spaced from said disk, said domed portion being resiliently deflectable into engagement with the other of said first and second electrical contacts for electrically connecting said first and said second electrical contacts, said member moving to engage said dome switch to deflect said domed portion to actuate said second switch.

9. An apparatus for controlling an electric motor for, when energized, moving a vehicle window selectively up or down and selectively in an auto up or auto down mode, said apparatus comprising:

an electrical circuit electrically coupled to the electric motor to energize the electrical motor to move the window toward one of fully open and fully closed positions, said circuit including:

a printed circuit board;

a first switch for selectively energizing the electrical motor;

an actuator movable to actuate said first switch to actuate the electrical motor; and a second switch for selectively energizing the electrical motor in an auto function mode, said second switch being activated by a member extending through said printed circuit board, said second swicth comprising:

a first electrical contact;

a second electrical contact electrically insulated from said first electrical contact;

an electrically conductive disk having a periphrey and a domed protion, said disk being in electrical communication with one of said first and second electrical contacts at said periphery of said disk, the other of said first and second electrical contacts located adjacent said disk and initially spaced from said disk, said domed portion being resiliently deflectable by said member into engagement with the other of said first and second electrical contacts to provide electrical communication between said first and second electrical contacts to energize said electric motor;

a first member supported for movement and being movable in response to manual force applied thereto to effect, upon movement to a predetermined position, deflection of said domed portion into engagement with the other of said first and second electrical contacts of said disk; and wherein energization of said electric motor is maintained after said domed portion of said disk disengages said other of said first and second contacts.

10. An apparatus for controlling an electric motor for, when energized, moving a vehicle window selectively up or down and selectively in an auto up or auto down mode, said apparatus comprising:

an electrical circuit electrically coupled to the electric motor to energize the electrical motor to move the window toward one of fully open and fully closed positions, said circuit including:

a printed circuit board;

a first switch for selectively energizing the electrical motor;

an actuator movable to actuate said first switch to actuate the electrical motor;

a second switch for selectively energizing the electrical motor in an auto function mode, said second switch being activated by a member extending through said printed circuit board; and a first electrical contact and a second electrical contact electrically insulated from said first electrical contact, said first and second electrical contacts being operatively connected to said second switch, one of said first and second contacts comprise a terminal for helping to mount said second switch to said board, said terminal comprising a compliant pin connector, wherein actuation of said second switch provides electrical communication between said first and second electrical contacts to energize the electric motor.

11. The apparatus of claim 10 wherein said second switch is carried by a housing.

* * * * *